April 23, 1940.
F. G. JORDAN
2,198,051
KALEIDOSCOPIC REFLECTING INSTRUMENT
Filed Sept. 12, 1938
3 Sheets-Sheet 1
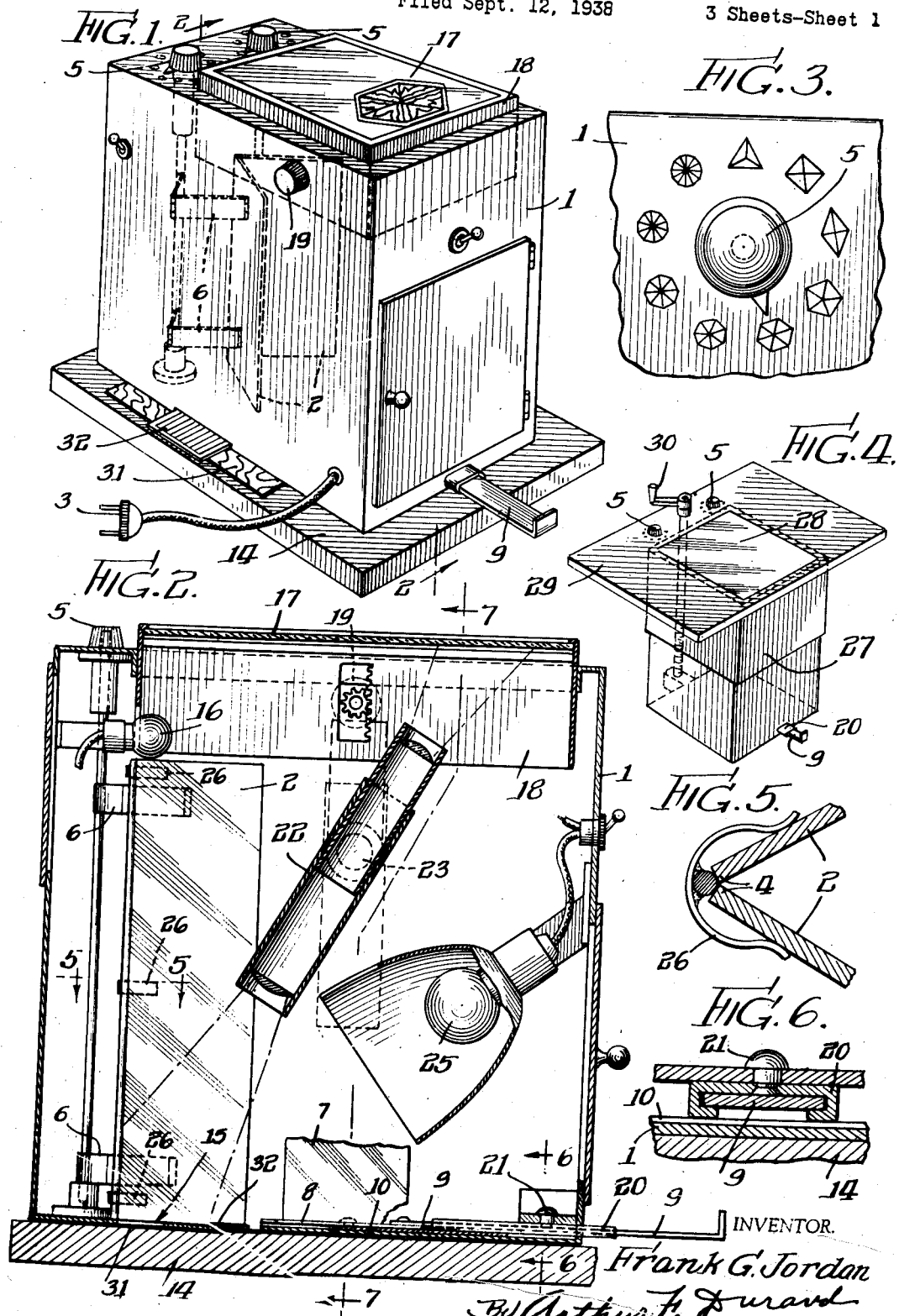
INVENTOR.
Frank G. Jordan
By Arthur F. Durand
ATTORNEY.

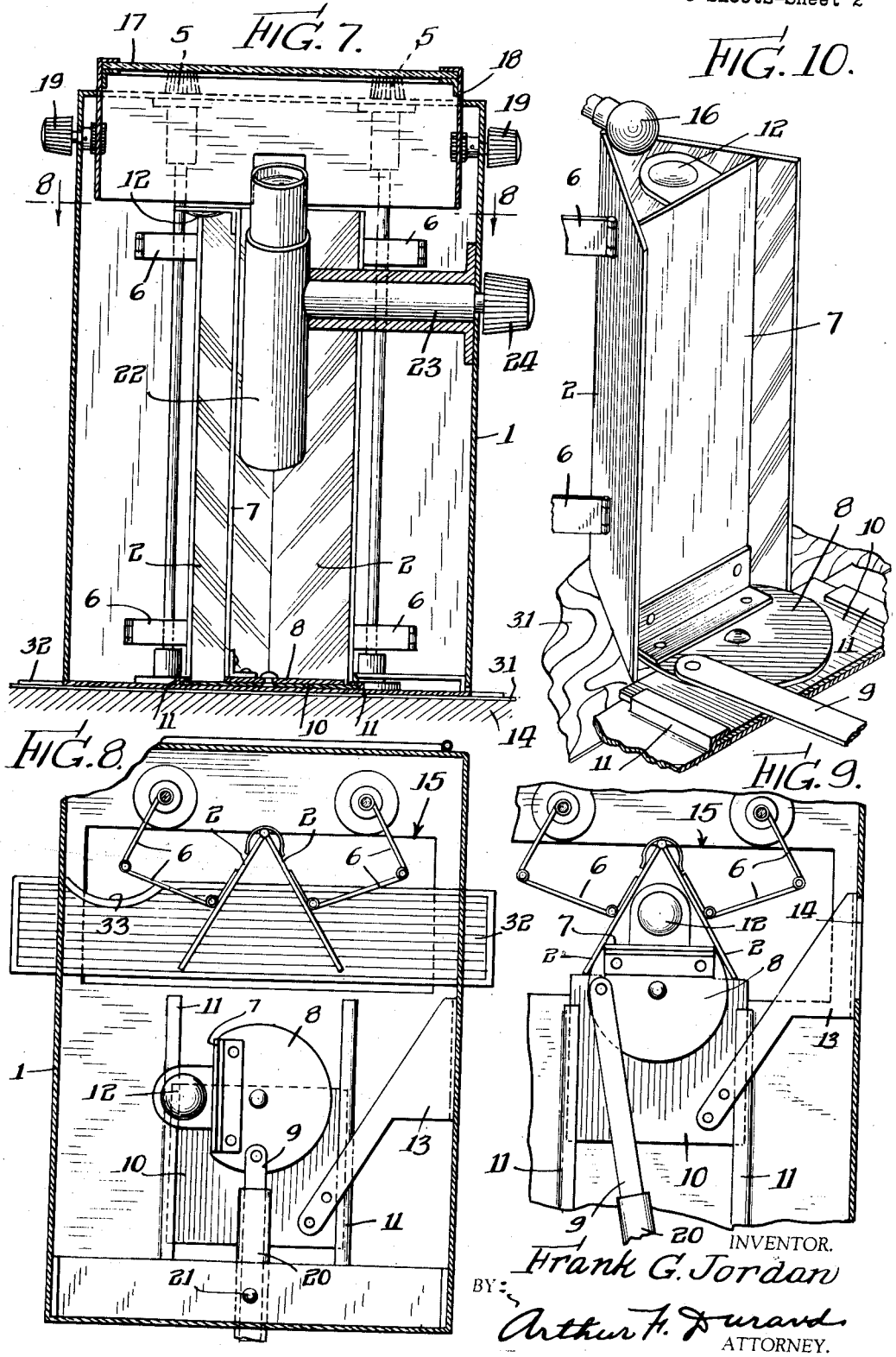

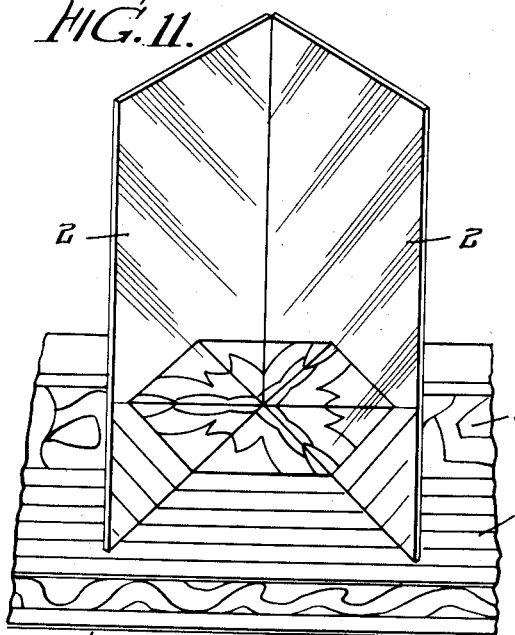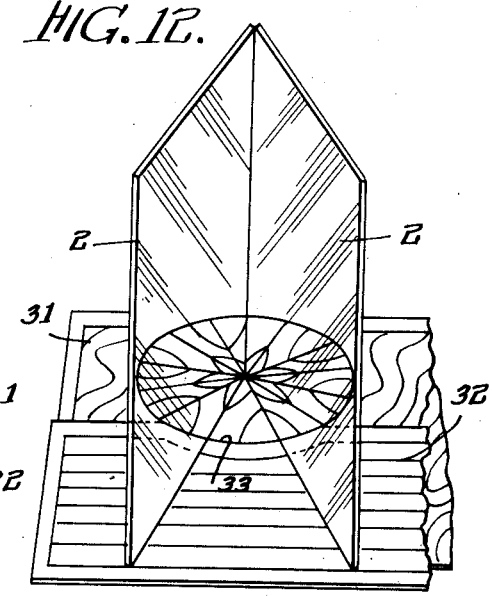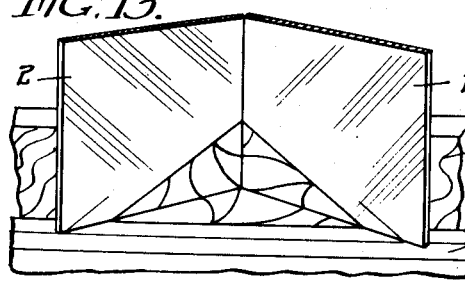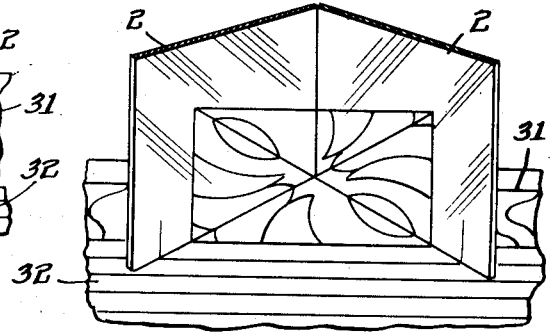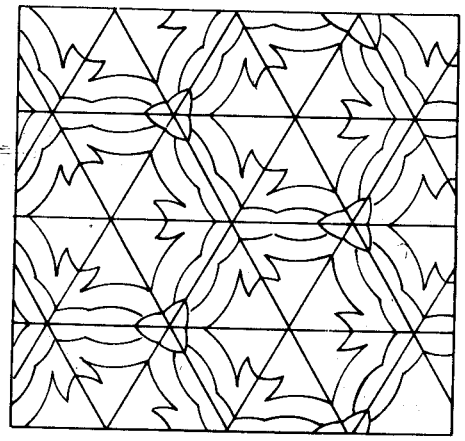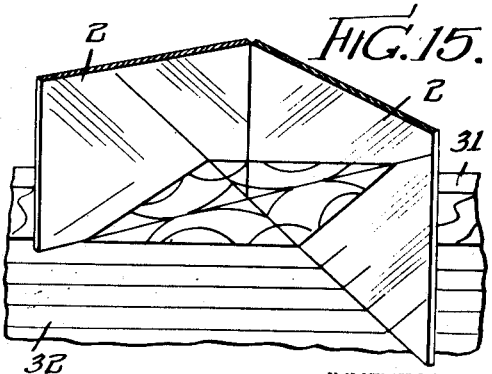

Patented Apr. 23, 1940

2,198,051

UNITED STATES PATENT OFFICE 2,198,051

KALEIDOSCOPIC REFLECTING INSTRUMENT

Frank G. Jordan, Bloomington, Ill.

Application September 12, 1938, Serial No. 229,501

4 Claims. (Cl. 88—15)

This invention relates to optical devices for producing different patterns by the use of mirrors arranged at an adjustable angle to each other.

Generally stated, the object of the invention is to provide a novel and improved construction and arrangement whereby the image constituting the desired pattern or the like is viewable at the top of a box or housing which encloses the mirrors and other elements which cooperate therewith to produce the desired image or pattern.

It is also an object to provide certain details and features of construction tending to increase the general efficiency and desirability of an enclosed or housed image or pattern producing instrument of this particular character.

To the foregoing and other useful ends, the invention consists in matters hereinafter set forth and claimed, and shown in the accompanying drawings, in which—

Fig. 1 is a perspective view of the preferred form of the invention.

Fig. 2 is a vertical cross section taken on the line 2—2 in Fig. 1.

Fig. 3 is a plan view of a dial showing geometric figures.

Fig. 4 is a perspective view of a modified form of the device.

Fig. 5 is a detail sectional view showing means to hold the rear edges of the mirrors together, taken on line 5—5 in Fig. 2.

Fig. 6 is a detail section taken on line 6—6 in Fig. 2, showing pivot connection for the lever.

Fig. 7 is a vertical sectional view taken on line 7—7 in Fig. 2.

Fig. 8 is a plan sectional view taken on line 8—8 in Fig. 7.

Fig. 9 is a view similar to Fig. 8, showing a changed position of one of the mirrors to produce an all-over pattern.

Fig. 10 is a fragmentary perspective view showing the arrangement of the mirrors for producing an all-over pattern.

Figs. 11, 12, 13, 14, and 15 are perspective views of various forms of geometric figures produced by the invention.

Fig. 16 is a view of an all-over pattern produced with the addition of a third mirror.

As thus illustrated, the invention comprises a box or housing 1 of any suitable or desired shape or character, adapted to enclose the mirrors 2 and other elements, so that the image or pattern desired can be viewed at the top of the box, the latter being preferably portable and having a plug 3 for insertion in any ordinary electric outlet, to supply any light necessary or desirable for the interior of said housing.

Preferably, the two mirrors 2 are held together by springs at their converging edges 4, and knobs 5 and 5 on the top of the housing have hinge link connections 6 which support the mirrors and serve to vary the angle between them.

A third mirror 7 is shown on a turn table 8 and controlled by a lever or link 9 to change the angle of this third mirror, the said turn table being mounted on a slidable plate 10 that slides in parallel horizontal guides 11, to position the third mirror for use or for non-use.

The mirror 7 has a lens 12 at the top thereof through which to view the image in the base of each mirror.

A guard 13 is rigid with the plate 10 to control the opening 14, which latter is for the insertion of a border strip under the lower edges of the mirrors, when a polygonal or circular pattern is desired.

The instrument rests on a table 14 on which cards or sheets or objects may rest, under the opening 15 in the bottom of the housing. A light bulb 16 is preferably used to illuminate the sheet or strip when the third mirror is to be used. The resulting reflection in the mirror may be viewed downwardly through the lens 12, as shown.

To provide a reflected reproduction of said image, a plate 17 of ground glass or other suitable material may be provided at the top of the housing, on a vertically movable support 18, which latter is adjusted up or down for focusing purposes by the side knobs 19 on the sides of the box.

The guide 20 that the lever 9 slides in is pivoted at 21 as shown.

The mirror 7 is only used and only moved into position, as shown in Fig. 10, when an all-over pattern, in a rectangle, as shown in Fig. 16, is desired.

Each knob 5 can have geometric indications around it, as shown in Fig. 3, with an indicator on the knob to point to any figure desired for the image.

The projector 22 is tubular and provided with lenses focused to project the image onto the lower surface of the plate 17 previously mentioned. The projector is mounted on a trunnion 23 having a knob 24 on the side of the instrument box or housing. Thus the projector 22 can be angled for use, or it can be mounted out of the way to permit the mirror 7 to be moved into operative position.

The lamp 25 furnishes light to illuminate the image for reflection and projection through the projector 22, for the different geometrical figures, or for a round image. But when an all-over pattern is desired, the lamp is extinguished, and the bulb 16 is relied upon at such time, and the all-over pattern may, by proper light and lens power, be thrown on the plate 17, and traced therefrom, just as other patterns may be traced from the image projected onto said plate by the projector 22 previously mentioned.

Springs 26 may assist in controlling the mirrors 2—2 as shown in Fig. 5 of the drawings.

Fig. 4, it will be seen, shows a body 27 movable up and down with a ground glass plate 28 in the plane of a drawing board 29 on which the image on the plate may be traced onto paper. A crank screw device 30 may be used to move the body 27 up and down, to get the right focus.

The pattern strip 31 and the border strip 32, the latter with the curved notch 33, are shown in Figs. 1 and 8 of the drawings, and their method of use is indicated in Figs. 11 and 12 of the drawings.

The mirrors are preferably of metal, and are without frames or rims, to prevent distortion or mutilation of the image.

In both Figs. 1 and 4 the horizontal ground glass plate forms the upper end of a vertical housing section that has a telescoping action at the top of the structure, and this vertical telescoping action serves to raise and lower the said plate, for focusing purposes, and while this is done in Fig. 1 with a rack and pinion device for the handle 19, it is done with a vertical screw device operated by the handle 30 in Fig. 4 of the drawings. Thus, in either form of the invention, the horizontal ground glass plate upon which the image is reflected or thrown, so that it is visible outside the housing, is movable up and down for focusing purposes, and forms a table upon which the image can be traced on paper.

Thus it will be seen that the invention provides means, as shown and described, and as pointed out in the claims, whereby the instrument can be used without the functioning of the projector 22, as by adjusting the latter into the vertical position shown in dotted lines in Fig. 2 of the drawings. It is obvious that the instrument may thus be used, in different ways, novel means being provided for that purpose.

What I claim as my invention is:

1. An optical instrument comprising a box or instrument housing, a plurality of vertical mirrors in said housing, each mirror having vertical side edges arranged for forming an image by the reflection therein of any surface or object disposed between the lower ends thereof, and manual means on the outside of said housing to control the angle of said mirrors, by moving each mirror about a vertical axis, said mirrors comprising two hinged together at their converging vertical edges, and a third for moving into and out of position between said two mirrors, and means for so adjusting said third mirror.

2. An optical instrument comprising a box-like housing, a horizontal glass plate for the top of said housing, vertical mirrors in the housing, movable about a vertical axis to form a reflected image of the desired character, means outside the housing for controlling the relative adjustment of said mirrors, about said vertical axis, including a separate handle for each mirror, each handle being operable about an axis parallel with said mirror axis, and an angular projector within the housing for throwing the image on the under side of said plate, comprising another mirror movable into position for co-operation with said first-mentioned mirrors, and means for moving said projector out of the way when it is desired to move said other mirror into operative position, so that the instrument can be used either way.

3. An optical instrument comprising a box-like housing, a horizontal glass plate for the top of said housing, vertical mirrors in the housing, movable about a vertical axis to form a reflected image of the desired character, means outside the housing for controlling the relative adjustment of said mirrors, about said vertical axis, including a separate handle for each mirror, each handle being operable about an axis parallel with said mirror axis, and an angular projector within the housing for throwing the image on the under side of said plate, comprising another mirror movable into position for co-operation with said first mentioned mirrors, and a lens at the top of said other mirror for viewing the image formed by all of the mirrors, together with means adjacent said lens for illuminating said image, so that the instrument can be used either with or without the functioning of said projector.

4. An optical instrument comprising a box-like housing, a horizontal glass plate for the top of said housing, vertical mirrors in the housing, movable about a vertical axis to form a reflected image of the desired character, means outside the housing for controlling the relative adjustment of said mirrors, about said vertical axis, including a separate handle for each mirror, each handle being operable about an axis parallel with said mirror axis, and an angular projector within the housing for throwing the image on the under side of said plate, comprising another mirror movable into position for co-operation with said first-mentioned mirrors, means for downwardly viewing the image formed by all of the mirrors, and means outside of said housing for controlling the adjustment of said other mirror into and out of operative position, so that the instrument can be used either with or without the functioning of said projector.

FRANK G. JORDAN.